W. L. LEEDY.
DAMPER CONTROL DEVICE.
APPLICATION FILED SEPT. 7, 1921.
1,417,259.
Patented May 23, 1922.
2 SHEETS—SHEET 1.
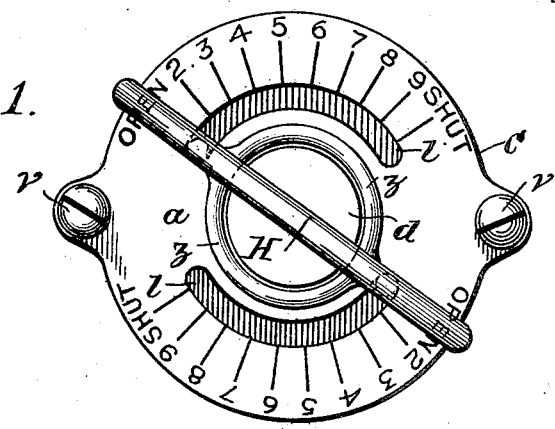
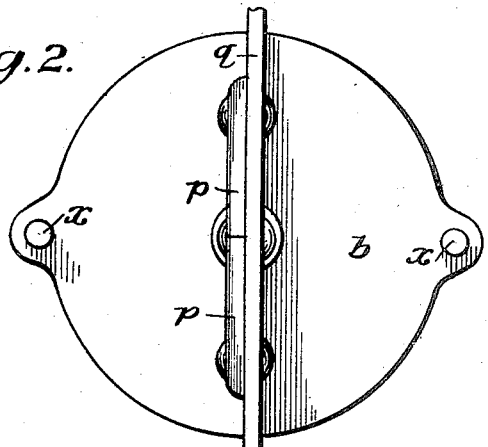
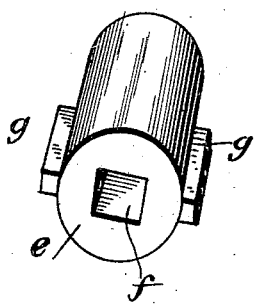
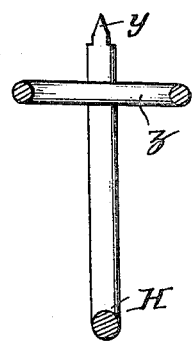
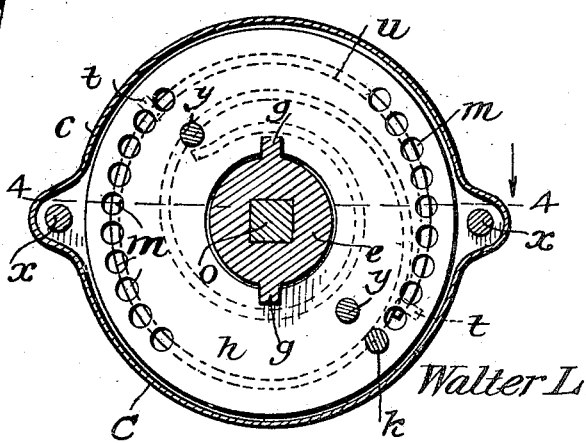
Inventor
Walter L. Leedy,
By W.C.Carman
Attorney W. L. LEEDY.
DAMPER CONTROL DEVICE.
APPLICATION FILED SEPT. 7, 1921.
1,417,259.
Patented May 23, 1922.
2 SHEETS—SHEET 2.
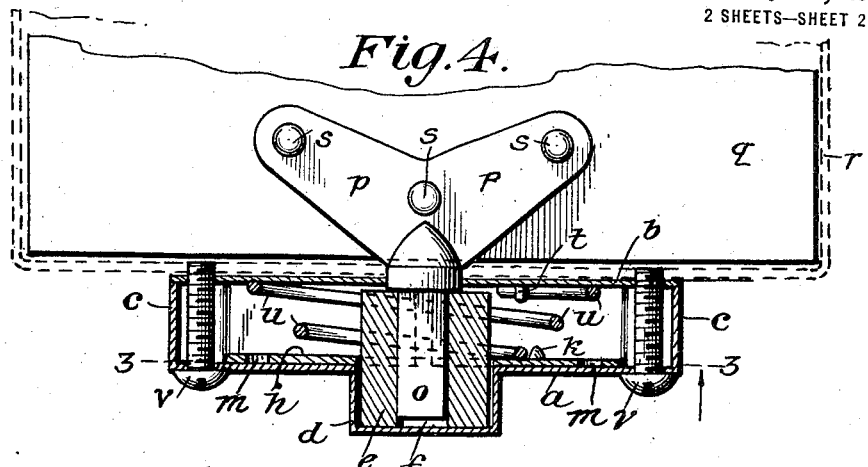
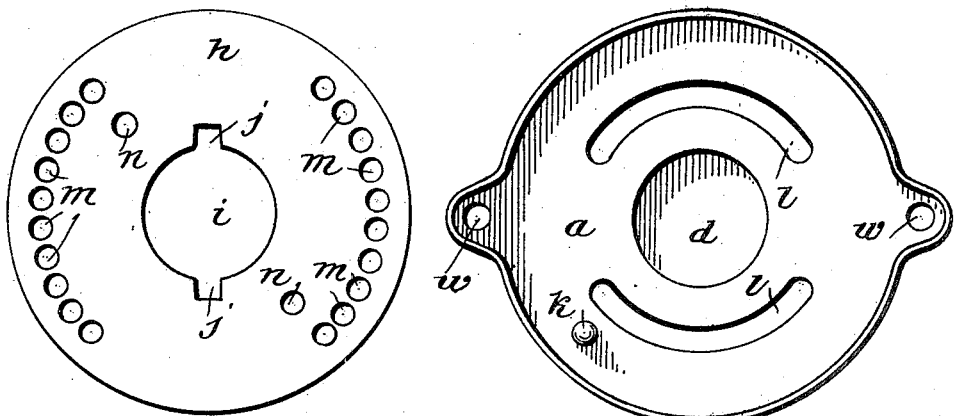
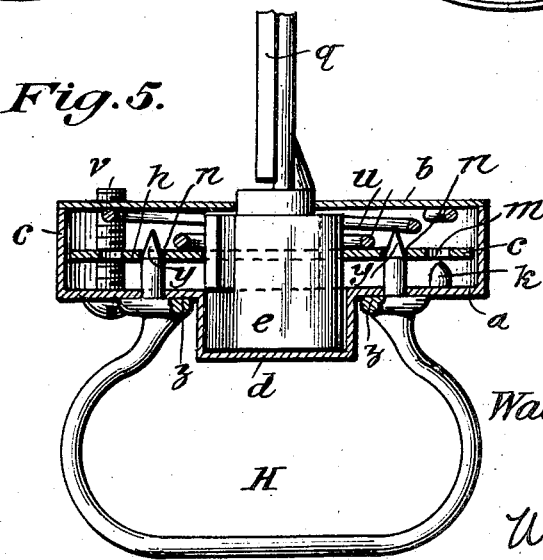
Inventor
Walter L. Leedy,
W. C. Carman
Attorney

UNITED STATES PATENT OFFICE.

WALTER L. LEEDY, OF YOUNGSTOWN, OHIO.

DAMPER-CONTROL DEVICE.

1,417,259.  Specification of Letters Patent.  Patented May 23, 1922.

Application filed September 7, 1921. Serial No. 499,080.

*To all whom it may concern:*

Be it known that I, WALTER L. LEEDY, citizen of the United States, residing at Youngstown, in the county of Mahoning and State of Ohio, have invented certain new and useful Improvements in Damper-Control Devices, of which the following is a specification.

This invention relates to dampers for heating and ventilator flues and similar purposes,—the object being to provide a neat, convenient and efficient means for securely locking the damper in any desired position in the flue.

In the accompanying drawings, Figure 1 is a front view of my device, with the operating handle inserted.

Figure 2 is a rear view, showing an edge view of a section of the damper fastened to the wings of the spindle.

Figure 3 is a vertical sectional view on line 3—3 Figure 4.

Figure 4 is a combination horizontal sectional view on line 4—4, Figure 3, and a fragmentary side view of a damper in the flue with the actuating shank of the device attached thereto.

Figure 5 is a horizontal section similar to that in Figure 4, but with the operating handle inserted, showing the locking disk released from the locking element and in position to turn.

Figure 6 is a plan view of the front plate of the casing.

Figure 7 is a plan view of the locking disk.

Figure 8 is a perspective view of the hub or shank upon which the locking disk is mounted.

Figure 9 is a fragmentary view of the operating handle.

Generally speaking, my device comprises a casing having a socket or bearing in the front face, in which is mounted a hub or shaft having a central longitudinal opening angular in cross-section, and a pair of splines, fins or feather-keys on its periphery, a disk having a central opening to receive the shaft or hub, radial slots in said opening to engage the splines in the hub, and a plurality of circumferentially disposed holes, a spiral spring to hold the disk normally in engagement with a lug on the inner face of the front plate of the casing, and a spindle or shank connecting said hub or shaft with the damper.

C represents the casing; $a$ the front plate thereof; $b$ the back plate; and $c$ the wall.

Formed integrally with the front plate $a$ is an outwardly extending socket or bearing $d$, in which is mounted the free end of the hub or shank $e$, which is provided with the central longitudinal opening $f$, angular in outline, and a pair of splines, fins or feather-keys $g$ on its periphery. The front plate $a$ is also provided, adjacent its outer edge, with an inwardly projecting lug $k$ (Figure 5), and oppositely disposed curved slots $l$, each for the purpose hereinafter explained. $h$ is a disk having a central opening $i$, which fits loosely over the hub or shaft $e$, with radial slots $j$ to engage the splines or fins $g$ on the shaft. This disk is also provided with a plurality of circumferentially disposed openings $m$, and a pair of oppositely disposed openings $n$ somewhat nearer its center. $o$ is a shank or spindle, shaped on its inner end to engage the longitudinal opening $f$ in the hub $e$, and carrying at its outer end the wings $p$, to which is attached the damper $q$ in the flue $r$, by means of rivets or bolts $s$.

Secured to the inner face of the back plate $b$, by means of hooks or fastenings $t$, is a coil-spring $u$, the opposite end of which impinges on the inner face of the disk $h$ to hold it normally against the inner face of the front plate $a$ in engagement with the lug $k$ which engages one of the openings $m$ for the purpose of locking the disk in its adjusted position.

For the purpose of indicating the position of the damper in the flue, I place a graduated scale upon the face of the front plate $a$ of the casing C.

To assemble the device, the free end of the hub $e$ is inserted in the socket $d$, and the disk $h$ mounted upon the hub, with the slots $j$ engaging the splines $g$. The back plate $b$, carrying the spring $u$, is then placed in position, with the coils of the spring surrounding or embracing the hub $e$, after which the threaded screw bolts $v$ are passed through the openings $w$ in the front plate $a$, and screwed into the inner threaded openings $x$ in the back plate $b$. The bolts $v$ are also of sufficient length to turn into inner threaded openings in the wall of the flue for the purpose of fastening the device to the outer wall of the flue.

The operation of my device is as follows: When it is desired to adjust the damper, the oppositely disposed points $y$ of the handle H are inserted in the openings $n$ in the disk $h$ through the curved slots $l$ in the front plate of the casing and sufficient pressure applied to force the disk $h$ away from the front plate, against the pressure of the spring $u$, until it becomes disengaged from the lug $k$, after which the disk may be turned to any desired point by simply twisting or turning the handle. As the disk $h$ rotates it will, through the medium of the shaft $e$ and the shank or stem $o$, carry the damper $q$ with it, and when the damper has been turned to the desired point or angle in the flue, as indicated by the scale on the front plate of the casing, the pressure on the handle may be released and the spring $u$ will force the disk $h$ forward against the front of the casing and into engagement with the holding lug $k$ where it will be securely held until again released by means of the handle.

The ring or circle $z$, formed between the points $y$ of the handle, will encompass the outer circumference of the socket $d$ and serve as a guide in turning the handle.

I claim:

1. In a device of the character described, a casing, a shaft rotatably mounted in said casing, a disk slidably mounted upon said shaft and locked against independent rotation, means for rotating said disk, and means for locking the disk in any desired position.

2. In a device of the character described, a casing, a shaft provided with splines rotatably mounted in said casing, a disk provided with slots to be engaged by said splines slidably mounted upon said shaft, means for rotating said disk and means for locking it in any desired position.

3. In a device of the character described, a casing, a shaft rotatably mounted in said casing and provided with splines, a disk slidably mounted upon said shaft and provided with slots to be engaged by said splines, and also with a series of circumferentially disposed openings, a lug on the inner face of the front plate of said casing, and means for rotating said disk.

4. In a device of the character described, a casing, having a socket in its front plate, a shaft rotatably mounted in said socket, a disk slidably mounted upon said shaft and locked against independent rotation, means for rotating said disk, and means for locking it in any desired position.

5. In a device of the character described, a casing provided with a socket in its front plate, a shaft provided with splines rotatably mounted in said socket, a disk slidably mounted upon said shaft and provided with slots to be engaged by said splines, and also with a series of circumferentially disposed openings, a lug on the inner face of the front plate of said casing, and means for rotating said disk.

6. In a device of the character described, a casing provided with a socket in its front plate, a shaft provided with splines rotatably mounted in said socket, a disk slidably mounted upon said shaft and provided with slots to be engaged by said splines and also with a series of circumferentially disposed openings, a lug on the inner face of the front plate of said casing, a spring adapted to hold said disk normally against said front plate, and means for rotating said disk.

In testimony whereof I hereunto affix my signature in the presence of two witnesses.

WALTER L. LEEDY.

Witnesses:
JOSEPH P. SABEL,
W. J. DUGUIN.